United States Patent [19]

Funakawa et al.

[11] Patent Number: 4,923,251
[45] Date of Patent: May 8, 1990

[54] APPARATUS FOR REMOVING ASBESTOS AND LIKE MATERIALS FROM A SURFACE

[75] Inventors: Naoyoshi Funakawa, Koshigaya; Yasuharu Iida, Chiba; Yasumitsu Moriki; Masahiro Sakurai, both of Tokyo, all of Japan

[73] Assignees: Sato Kogyo Co., Ltd.; Maruma Technica Co., Ltd., both of Japan

[21] Appl. No.: 314,844

[22] Filed: Feb. 24, 1989

[30] Foreign Application Priority Data

Apr. 4, 1988 [JP] Japan ................................ 63-83640
Oct. 20, 1988 [JP] Japan ................................ 63-262740
Oct. 20, 1988 [JP] Japan ................................ 63-306595

[51] Int. Cl.$^5$ ............................................. A47L 13/06
[52] U.S. Cl. .......................................... 299/64; 15/308; 51/180
[58] Field of Search ............. 299/12, 64; 15/49 R, 15/49 C, 50 C, 308, 312 R, 383; 51/170 PT, 170 R, 180; 29/81 H

[56] References Cited

U.S. PATENT DOCUMENTS

| | | | |
|---|---|---|---|
| 2,256,986 | 9/1941 | Likshis | 51/180 X |
| 3,722,147 | 3/1973 | Brenner | 51/180 X |
| 4,438,977 | 3/1984 | Chapel | 299/64 |
| 4,752,103 | 6/1988 | Smith | 299/64 |

FOREIGN PATENT DOCUMENTS 645147 10/1928 France ................................ 51/180

Primary Examiner—Stephen J. Novosad
Assistant Examiner—David J. Bagnell
Attorney, Agent, or Firm—Jones, Tullar & Cooper

[57] ABSTRACT

Apparatus for safely and efficiently removing a layer of asbestos or like material from a generally planar or corrugated ceiling surface, I-beams or the like is disclosed and comprises a head assembly including an outer cover having a first open portion adapted to face the asbestos layer and a second open portion communicating with suction means through asbestos collecting means, an open ended inner wall member mounted within the outer cover to define an air passage between the inner wall member and the outer cover, and a rotary wire brush mounted within the inner wall member and adapted to engage and remove the asbestos layer from the surfaces to be stripped. The apparatus also includes adjusting means for moving the head assembly to an operative position wherein the rotary wire brush is in scraping contact with the asbestos layer with a small gap present between the peripheral edge of the first open portion of the outer cover and the surface to be stripped. During a scraping operation, the suction means sucks the ambient air into the air passage in the outer cover through the small gap so that the sucked air entrains asbestos laden dust from the inner wall member to thereby prevent the escape of the removed asbestos to the ambient environment.

18 Claims, 12 Drawing Sheets

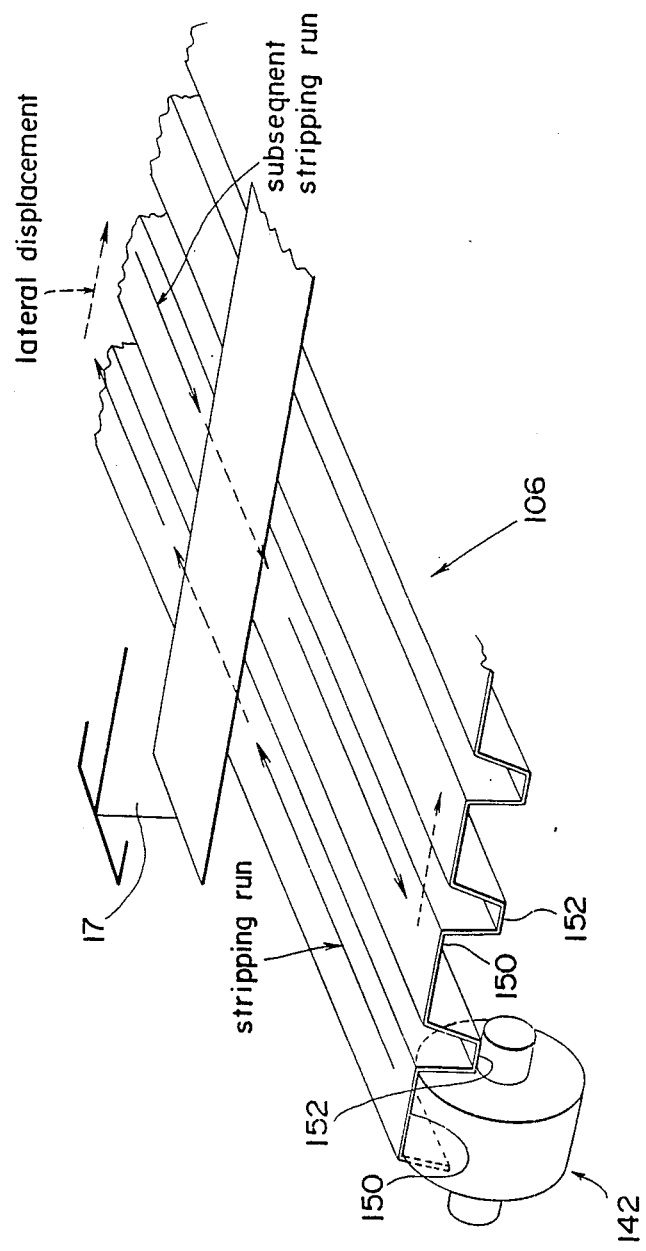

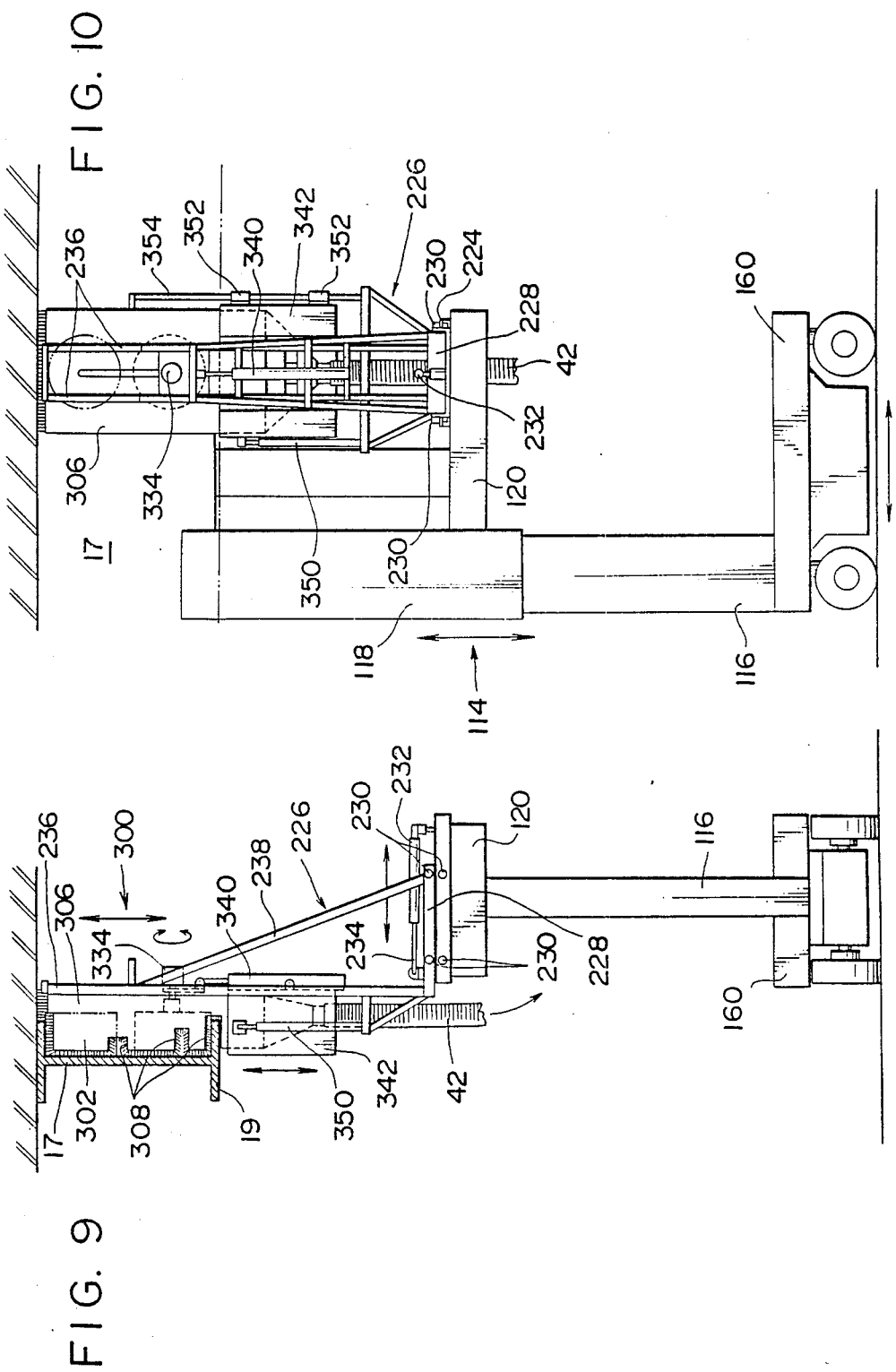

APPARATUS FOR REMOVING ASBESTOS AND LIKE MATERIALS FROM A SURFACE

BACKGROUND OF THE INVENTION

The present invention relates generally to apparatus for removing material from a surface and, more particularly, to an improved apparatus for safely and efficiently removing asbestos or like materials from ceilings.

Asbestos finds widespread use in many applications. For example, asbestos is often utilized as an insulating material for buildings. Typically, a layer of asbestos is sprayed or otherwise deposited on building walls or ceilings which may have a generally planar or corrugated surface or supporting steel sections such as I-beams.

However, in recent years the health hazards of asbestos have become widely recognized, and various measures have been taken to halt its further use in environments where persons may be exposed to asbestos and also to remove and dispose of asbestos which has already been in place in buildings. A typical prior art method for removal of asbestos may comprise the following steps. Prior to scraping, a sheet of plastic material is used to cover a floor surface, piping, etc., within the work area, having no asbestos deposited thereon. A suitable ventilation equipment is provided. Liquid such as water is sprayed on the asbestos layer to reduce the amount of asbestos laden dust to be generated during scraping operation. Then, the workers remove the asbestos layer with scrapers or power driven tools. Asbestos particles thus removed are collected and sucked for disposal. Any dust which remains adhered to the surface after abrading or scraping is fixed to the surface by using certain chemicals which may be applied thereto to prevent such dust from falling.

As will be appreciated, much of the conventional asbestos removal work involves hand labor. Thus, it is costly and time-consuming, particularly, in hard-to-reach areas such as high ceilings. If the ceilings have corrugated surfaces or supporting steel sections, such as T-beams, depending therefrom, that would add to the difficulty of removing asbestos in a safe, efficient and economical manner. Further, the generation of dangerous amount of asbestos dust requires the workers to wear various forms of protection such as dust-tight clothing or mask, and this can greatly impair the work efficiency.

It is, accordingly, an object of the present invention to provide an improved apparatus for removing asbestos or like materials from ceilings with a view to overcoming the deficiencies of the prior art apparatus.

It is another object of the present invention to provide an improved asbestos removing apparatus which minimizes the amount of asbestos laden dust escaping therefrom into the surrounding atmosphere.

It is a further object of the present invention to provide an improved apparatus for removing asbestos from ceilings having a generally planar or corrugated surface or supporting steel sections, such as I-beams, in a manner that minimizes the amount of hand labor required to do the removal work.

SUMMARY OF THE INVENTION

Broadly stated, the present invention provides apparatus for removing a layer of asbestos or like material from a surface, comprising a head assembly comprising an outer cover having a first open portion adapted to face the asbestos layer and a second open portion comprising an outlet for the outer cover, an inner wall member mounted within the outer cover to define an air passage between the peripheral edges of the inner wall member and the first open portion of the outer cover, the air passage communicating with the outlet of the outer cover, and scraping means mounted within the inner wall member and adapted to engage and remove the asbestos layer from the surface; lift means for raising the head assembly in proximity to the surface, the lift means being adatped to travel on a floor in a direction parallel to the plane of the surface; adjusting means disposed between the head assembly and the lift means for adjustably moving the head assembly to an operative position wherein the scraping means is in scraping contact with the asbestos layer while maintaining a small gap between the surface and the peripheral edge of the first open portion of the outer cover; and collection means communicating with the outlet of the outer cover and including suction means for withdrawing the removed asbestos from the outer cover, the suction means being effective to such the ambient air into the air passage in the outer cover through the small gap between the peripheral edge of the first open portion thereof and the surface to be scraped so that the sucked air entrains asbestos laden dust from the inner wall member, thereby preventing the escape of the removed asbestos to the ambient environment.

The present invention also provides an apparatus for removing a layer of asbestos or like material from an I-beam having a web portion and an upper and a lower flange portion, comprising a head assembly comprising an outer cover having a first open portion adapted to face the web portion, a second open portion adapted to face the upper flange portion of the I-beam and a third open portion comprising an outlet for the outer cover, an inner wall member mounted within the outer cover to define an air passage between the inner wall member and the outer cover, the air passage communicating with the outlet of the outer cover, and scraping means mounted within the inner wall member and adapted to engage and remove the asbestos layer from the I-beam; hood means mounted on the head assembly for vertical movement relative to the inner wall member and the outer cover to sealingly surround a portion of the first open portion of the outer cover; lift means for raising the head assembly in proximity to the I-beam to be scraped, the lift means being adapted to travel on a floor in a direction parallel to the I-beam; adjusting means disposed between the head assembly and the lift means for adjustably moving the head assembly to an operative position wherein the scraping means is in scraping contact with the surface of the I-beam with a small gap present between the peripheral edges of the first and second open portions of the outer cover and the web portion and the undersurface of the upper flange of the I-beam; collection means communicating with the outlet of the outer cover and including suction means for withdrawing the removed asbestos from the outer cover, the suction means being effective to suck the ambient air into the air passage in the outer cover through the small gap between the peripheral edges of the first and second open portions of the outer cover and the surfaces of the I-beam being scraped so that the sucked air entrains asbestos laden dust from the inner wall member, thereby preventing the escape of the removed asbestos to the ambient environment.

BRIEF DESCRIPTION OF THE DRAWINGS

The invention will be better understood from the following detailed description of preferred embodiments thereof, when taken in conjunction with the accompanying drawings, in which:

FIG. 8 is a schematic view showing how the apparatus of FIG. 3 is used to remove asbestos from the corrugated ceiling surface;

FIG. 9 is a schematic front elevation of an asbestos removing apparatus in accordance with a third embodiment of the present invention;

FIG. 10 is a schematic side elevation of the asbestos removing apparatus of FIG. 9;

DESCRIPTION OF PREFERRED EMBODIMENTS

Figure 1A:
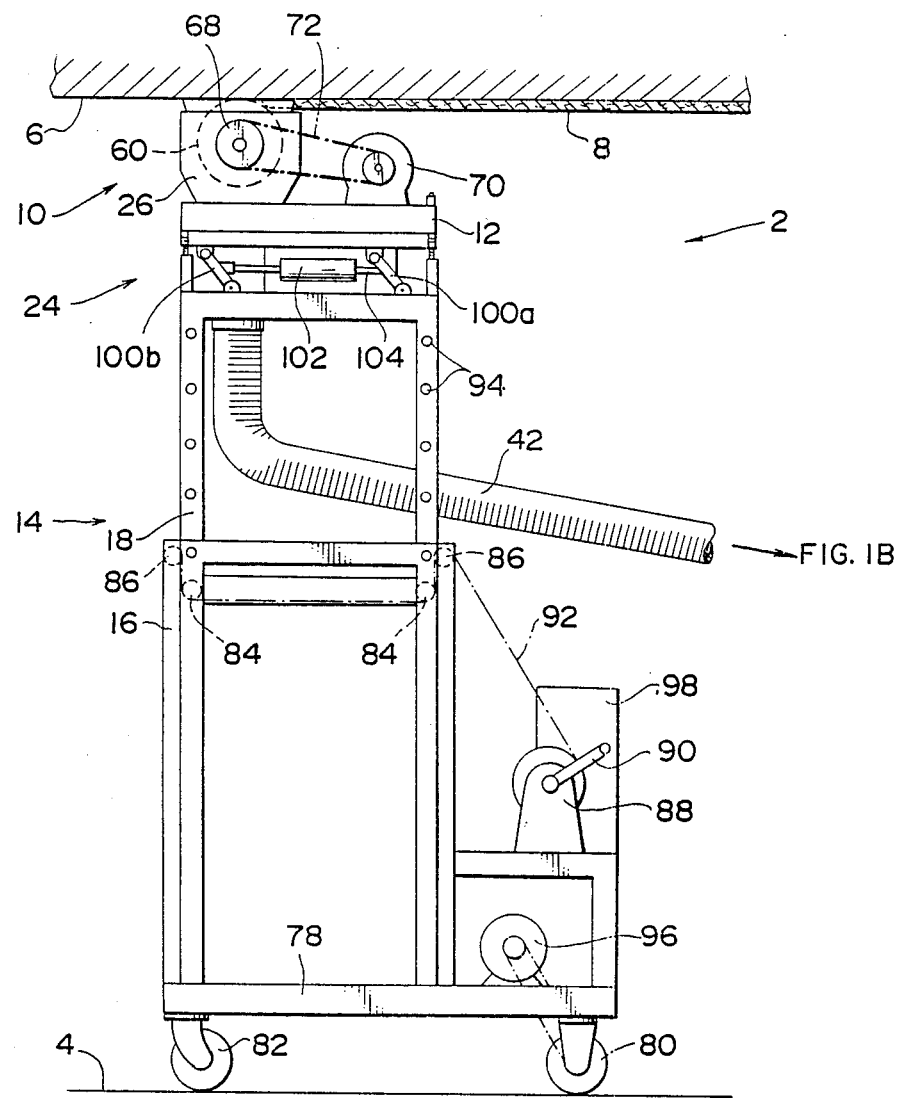
FIG. 1 is a schematic side elevation of an apparatus for removing asbestos from ceilings in accordance with a first embodiment of the present invention.

In the following description, like reference numerals are to be used to identify like or corresponding parts throughout the several figures of the drawings, and terms such as "forward", "rearward", "left", "right", "upwardly", "downwardly", and the like are used as words of convenience not to be construed as limiting terms.

Figure 1B:
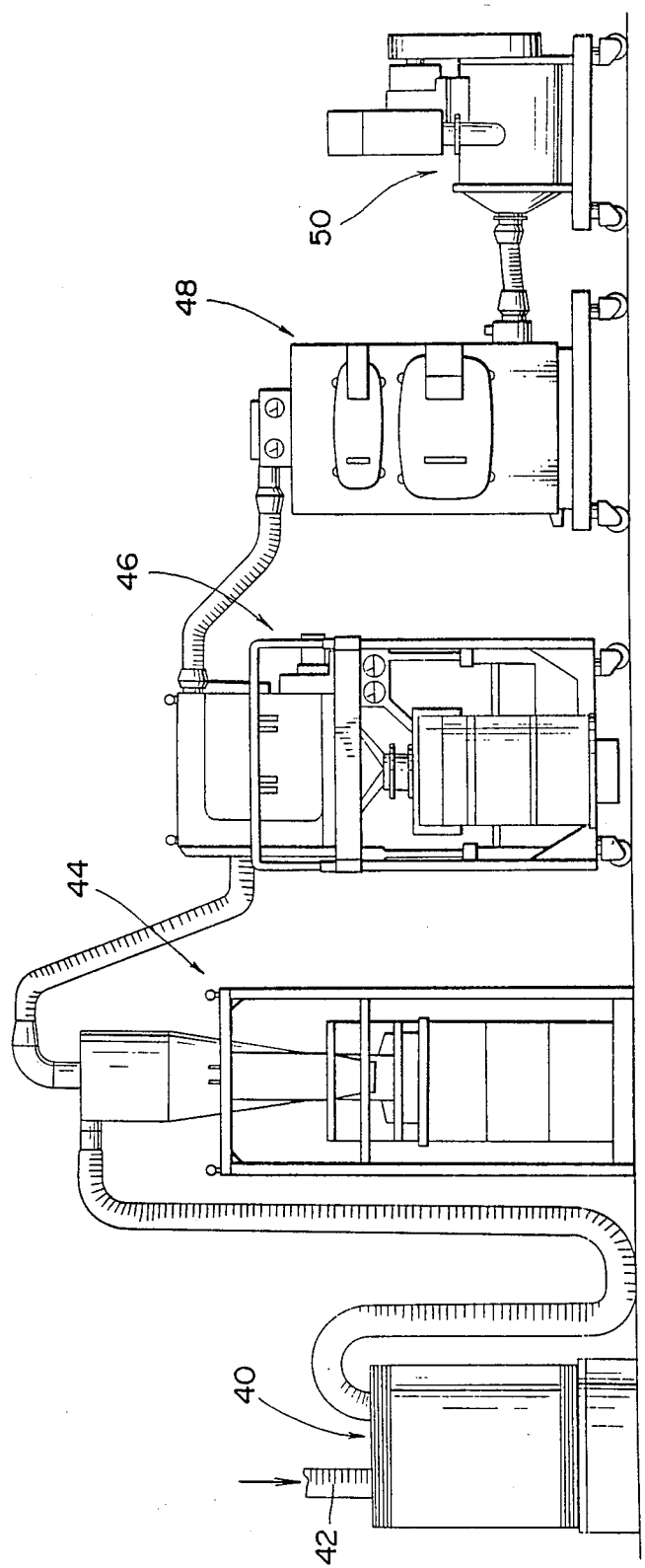
Figure 2:
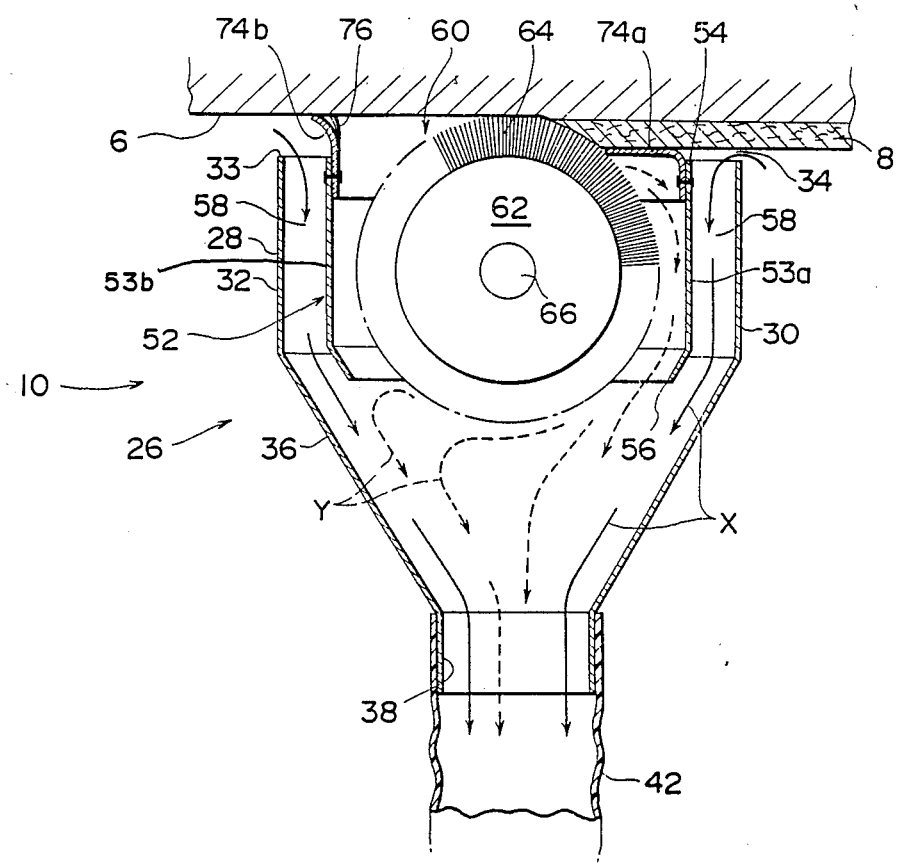
FIG. 2 is an enlarged sectional view of an asbestos removing head assembly used in the inventive apparatus of FIG. 1 with a wire brush adapted to strip the ceiling surface.

Referring now to the drawings and particularly to FIGS. 1 and 2, there is shown an asbestos removing apparatus as constructed in accordance with the teachings of the present invention. The asbestos removing apparatus is generally designated by the numeral 2 and is adapted to travel along a horizontal floor surface 4 beneath a building ceiling surface 6. As shown, the ceiling 6 has sprayed or otherwise deposited thereon a layer of asbestos 8 which is to be removed by the present apparatus.

The asbestos removing apparatus 2 comprises a head assembly 10 for removing or scraping asbestos from the ceiling, a support 12 for the head assembly, and lift means 14 including a lower frame 16 and an upper frame 18 on which the support 12 is mounted, the lower frame having front and rear sets of wheels 80 and 82, respectively, which are adapted to travel on the floor 4. The lift means 14 serves to raise the head assembly 10 upwardly to an operative position with the ceiling. The support 12 also includes an adjustment mechanism 24 in the form of spring-loaded guide rods or hydraulically operated equivalents for maintaining a substantially parallel relationship between the top of the head assembly 10 and the ceiling surface 6 and also for compensating for minor variations in ceiling height.

The head assembly 10 comprises an outer cover or hood 26 which generally takes the form of a chute or hopper of rectangular cross-section, as best seen in FIG. 2. The chute 26 has an upper four sided portion 28 (only the forward and rearward walls 30 and 32 of which are shown in FIG. 2) which has a top peripheral edge 33 defining an open top of the chute. It should be noted that during the asbestos removing operation the top edge of the chute upper portion 28 is positioned so as to leave an appropriate gap 34 between the chute top edge and the asbestos layer 8 to allow ambient air to enter into the open top of the outer cover 26. This is important because the scraping or rubbing action of the top cover edge against the asbestos layer 8 would otherwise generate a substantial amount of asbestos dust which can scatter or disperse into the surrounding area outside the outer cover 26, providing the possibility of serious human health hazards. The outer cover 26 also has a lower tapered or convergent portion 36 which is removably supported by the support frame 12. The lower portion 36 defines at the bottom a discharge outlet 38 which is in communication with an asbestos collecting drum 40 (See FIG. 1B) via a flexible conduit or hose 42 extending therebetween. The collection drum 40 is fluidly connected through a cyclone separator 44, a bag filter unit 46 and a HEPA filter unit 48 to suction means such as an exhaust fan 50, all of which may be located outside the working area. In alternate arrangements, the collection drum 40 may be removaly mounted at an appropriate place on the asbestos removing apparatus 2.

Disposed within the upper portion 28 of the outer cover 26 is an inner cover or wall member 52 which may be similar in shape to, but of smaller size than, the outer cover 26. The inner cover has an open upper portion 54 adapted to face the layer of asbestos to be scraped and a lower portion 56 opening to the convergent portion 36 of the chute 26. The inner cover 52 is secured to the inside of the outer cover 26 by appropriate means (not shown) in such a manner as to define therebetween a space or air gap 58 which is also in communication with the air inlet 34 as well as the bottom outlet 38 of the chute 26. Thus, it will be readily appreciated that when the exhaust fan 50 is activated, the resulting suction force will cause ambient air to be forcibly drawn through the inlet 34 into the passage 58 between the outer and inner covers 26 and 52 and then downwardly into the suction hose 42, as indicated by arrow X in FIG. 2. The inner cover also has a rectangular top peripheral edge 54 which preferably is arranged to be flush with the rectangular peripheral edge 33 of the open top of the outer cover 26.

The head assembly 10 also includes an asbestos stripping element 60 mounted for rotation within the inner cover 52, which element comprises a rotary brush having an axis of rotation generally parallel to the ceiling surface 6. Preferably, the rotary brush has an axial length which is slightly smaller than the width of the open top of the inner cover 52. The rotary brush 60 comprises a cylindrical body 62 provided with a multiplicity of radially extending wire bristles 64. The stripping element 60 is mounted within the inner cover 52 such that some wire bristles extend upwardly beyond a plane defined by the top edges 33 and 54 of the outer and inner covers 26 and 52, respectively, to enable the wire bristles to scrape off asbestos from the ceiling when the apparatus is set in an operative position relative to the ceiling. It is preferable that the rotary brush is arranged not only to remove the asbestos layer in its entirety but also to scrape off at least a thin surface layer of the material forming the ceiling to enable a perfect removal of asbestos materials from the ceiling.

The rotary brush 60 has a horizontally disposed driven shaft 66 which extends through, and projects from, the opposite side walls of the inner and outer covers 52 and 26 and which is journaled by bearing means (not shown) disposed therebetween. One of the projecting ends of the brush driven shaft 66 has mounted thereon a large diameter sprocket wheel 68, and an electric drive motor 70, also mounted on the support 12, is drivingly coupled with the sprocket wheel 68 through power transmission means such as a endless chain or belt 72 which passes around the drive shaft of the motor 70 and the sprocket wheel 68. With this arrangement, it is possible to selectively rotate the rotary brush in either a clockwise or non-clockwise direction. Through experiments, it has been found that a clockwise rotation of the rotary brush will provide better results in terms of scraping efficiency in the illustrated setup with the scraping element moving rightwards, as seen in FIG. 2, because the removed asbestos particles will hit the the forward portion of the inner cover whose top edge is held in more tight contact with the ceiling surface than the rear wall portion thereof.

Referring again to FIG. 2, the front and rear walls 53a and 53b of the inner cover 32 have resilient barrier means 74a and 74b, respectively, which are removably attached to the inside surfaces of the upper portion of the inner cover. Each of the barrier means may comprise a single layer strip made of elastic material such as rubber, elastomer or the like, having a length substantially equal to that of brush 60. The barrier strips 74a and 74b are attached to the front and rear walls of the inner cover 52, respectively, and projects upwardly from the respective top edges thereof to such an extent that the leading and trailing strips 74a and 74b can be yieldingly deformed backwards in close or sealing contact with the surfaces of the asbestos layer 8 and the ceiling 6, respectively. In this manner, the removed asbestos particles can be prevented from escaping to the ambient environment from the open top of the head assembly 10.

During the stripping operation, most of the asbestos pieces or particles removed from the ceiling surface 6 will impinge against the inner surface of the inner cover forward wall 53a and then be drawn through the lower portion 36 of the chute 26 into the suction conduit 42 in a flow pattern shown by the dotted lines Y in FIG. 2 under the action of the exhaust fan 50. With the use of wire brush 60 rotating in the clockwise direction, the layer of asbestos 8 per se advantageously acts as additional barrier means for the asbestos dust. Even if a small amount of asbestos dust escapes outwardly from the inner cover's open top area past the barrier strips 74a and 74b, it would be entrained in the air flowing through the air intake 34 into the passageway 58 between the outer and inner covers 26 and 52, thus eliminating the possibility of the dust escaping from the open top of the outer cover 26 into the ambient environment. The rate at which the air flows through the passageway 58 is preferably higher than five meters per second and the exhaust fan is controlled to provide such air flow rate.

Preferably, a brush 76 may be attached to at least the rearward strip barrier 74b to provide a final clean-up of any dust remaining on the ceiling surface after stripping of the ceiling is completed. Use of a brush having a higher density may serve as barrier means also and therefore the strip barrier 74b can be dispensed with. Alternatively, the barrier means may be of a multi-layer construction composed of several rubber materials having different hardness in order to enhance its ability to come into sealing contact with the surfaces of the ceiling or asbestos layer.

The asbestos and concrete pieces thus removed are entrained in the air passing through the conduit 42 into the drum 40 here a substantial portion thereof may be collected and accumulated. The dust laden air leaving the collection drum 40 is then passed into the cyclone separator 44 and the bag filter unit 46 and then to the HEPA filter unit 48 for filtration, and is finally emitted to the surrounding environment, free of dust, by the exahust fan 50.

Referring again to FIG. 1, the upper and lower frames 18 and 16 of the lift means 14 are arranged in a telescopic relationship so that the upper frame 18 may be slidably guided for vertical movement within the lower frame 16. The lower frame is supported by a base member 78 which includes the two pairs of front and rear wheels 80 and 82 adapted to travel on the floor 4. The upper frame 18 has two pulleys 84 mounted to the bottom thereof, and the lower frame 16 has two pulleys 86 attached to the top thereof. Mounted on the base member next to the lower frame is a winch 88 having a crank 90 which is turned by hand or an electric motor (not shown) to regulate the movement of a rope or cable 92 through the pulleys on the upper and lower frames to thereby vary the overall height of the upper frame 18 and accordingly the head assembly 10 of the asbestos removing apparatus. The upper frame 18 is provided along its vertically disposed portions with a series of spaced apart holes 94 which are adapted for pin connection to lugs (not shown) integrally formed with the lower frame 16. The purpose of this pin arrangement is to hold the hoist means 14 in its retracted or lowered position to thereby permit the asbestos removing apparatus to be brought into the work area through a somewhat small access opening (not shown) of the building. The base member 78 also carries a drive motor 96 for driving a pair of front wheels 80 by suitable means such as belting. The pair of rear wheels 82 are mounted to the base member 78 for pivotal movement about a vertical axis so as to allow the asbestos removing apparatus 2 to be turned at the end of each stripping run and then be aligned for the next run. As shown in FIG. 1, a control box 98 is provided on the base member adjacent the winch 88 to control the operation of the winch 88 and the drive motors 70 and 96. The control box 98 may be placed outside the working areas so as to be remotely controlled therefrom.

In the embodiment shown in FIG. 1, the adjusting mechanism 24 comprises at least one pair of spaced apart parallel links 100a and 100b each pivotally connected at their respective opposite ends to the underside of the support 12 and the movable upper frame 18 of the lift means 14, respectively, and a hydraulic double acting cylinder 102 secured relative to the movable frame 18 and having extending therethought a piston rod 104 pivoted at its opposite ends to the links 100a and 100b, respectively. As mentioned above, the operation of the adjusting mechanism 24 causes the wire brush 64 to be positioned in a delicate manner to a level such that the wire brush 64 can come into contact with the asbestos layer and further dig thereinto. The hydraulic cylinder 102 of the adjusting mechanism 24 also functions to absorb a shock caused due to variations in height between the floor and the ceiling as the apparatus 2 travels along a stripping run and transmitted downwardly from the ceiling to the asbestos scraping head assembly 10 and to compensate for such variations to provide a constant contact between the wire brush 64 and the asbestos layer 8 on the ceiling 6. Alternatively, the adjusting mechanism 24 can employ spring means which may be disposed between the support 12 and the movable upper frame 18.

In operation, the apparatus 2 is passed through a building access opening in its retracted position and moved to a place beneath a ceiling to be stripped. The winch 88 is then manually or remotely operated to lift the upper frame 18 relative to the lower frame 16 until the asbestos removing head assembly 10 comes into an operative position adjacent the asbestos layer 8 on the ceiling surface 6. At this point, the upper frame 18 is pinned to the lower frame 16. Then, the hydraulic cylinder 102 of the adjusting mechanism 24 is actuated to cause the wire brush 64 to come into contact with the asbestos layer 8 and then the drive motor 70 is activated to rotate the wire brush 64 while, at the same time, turning on the exhaust fan 50. It is preferable to further raise the wire brush 64 to such an extent that enables it to scrape off a thin surface layer of the ceiling after the asbestos layer has been removed, as best seen in FIG. 2, by controlling the hydraulic cylinder 102. The transport motor 96 is then energized to drive the front wheels 80 to slowly advance the asbestos removing apparatus on the floor. The speed at which the removal apparatus travels on the floor is determined based on various factors including the thickness of an asbestos layer, the scraping capability of a wire brush, etc. Upon completion of a stripping run of the asbestos removing apparatus 2, it is turned for another stripping run directed in the opposite direction. Alternatively, the transport motor could be reversed to cause the apparatus to travel in opposite directions. In this case, the drive motor 70 is also reversed.

The asbestos and ceiling concrete pieces thus removed are drawn into the suction conduit 42 along with the air being sucked into the passages 58 between the outer and inner covers 26 and 52. This arrangement serves to effectively prevent the escape of asbestos dust from the open top of the head assembly 10 to the ambient environment through possible gaps between the top edge thereof and the ceiling surface. The asbestos pieces entrained in the air are directed into the collection drum 40 where most of the asbestos material will fall by gravity to the bottom of the drum for subsequent disposal. Due to the suction created by the exhaust fan 50, asbestos dust or relatively fine particles may leave the drum 40, being entrained in the air. The dust laden air is then passed to the cyclone separator 44, the bag filter unit 46, the HEPA filter unit 48 and the exhaust fan 50 in the named sequence to emit clean air substantially free of dust into the surrounding atmosphere. Such an asbestos removing operation is continued until sensor means (not shown) on the collection drum 40 indicates that the drum has become fully loaded with the removed asbestos and ceiling concrete pieces. When this occurs, the filled drum 40 may be replaced by an empty drum for further operation. It is to be understood that during drum replacement, the operator may operate the control box 98 to deenergize the motors 70 and 96 as well as the exhaust fan 50.

FIGS. 3 to 8 illustrate a second embodiment of the present invention in which the asbestos removing apparatus is designed especially for use on a corrugated ceiling having an asbestos layer deposited on a corrugated metallic ceiling panel 106. In this embodiment, a hydraulic lift means 114 including a piston 116 and a cylinder 118 is employed in place of the mechanical lifter 14 of the above-described first embodiment. The piston 116 of the hydraulic lift means 114 is fixedly mounted at its lower end on a wheeled base 160, and a movable cylinder part 118 has rigidly attached thereto a horizontal carriage 120 which has atop a supporting framework 122 thereon.

Figure 3:
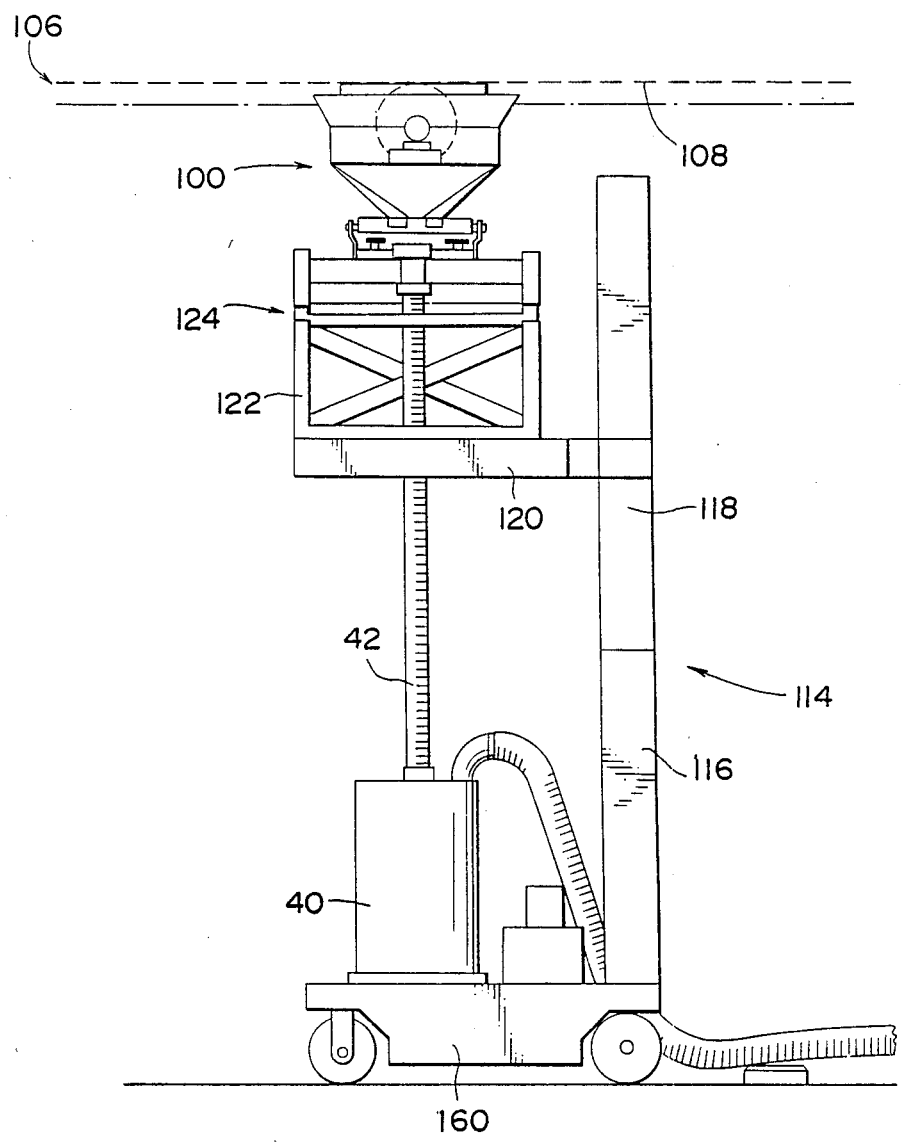
FIG. 3 is a view similar to FIG. 1, showing a second embodiment of the present invention which is adapted to remove asbestos from a corrugated ceiling surface.

As shown in FIG. 3, the framework 122 carries a positioning mechanism 124 for controllably moving an asbestos removing head assembly 100 upwardly into a proper relationship with the corrugated ceiling 106 in the manner to be described later in detail with reference to FIGS. 4 to 6.

Figure 4:
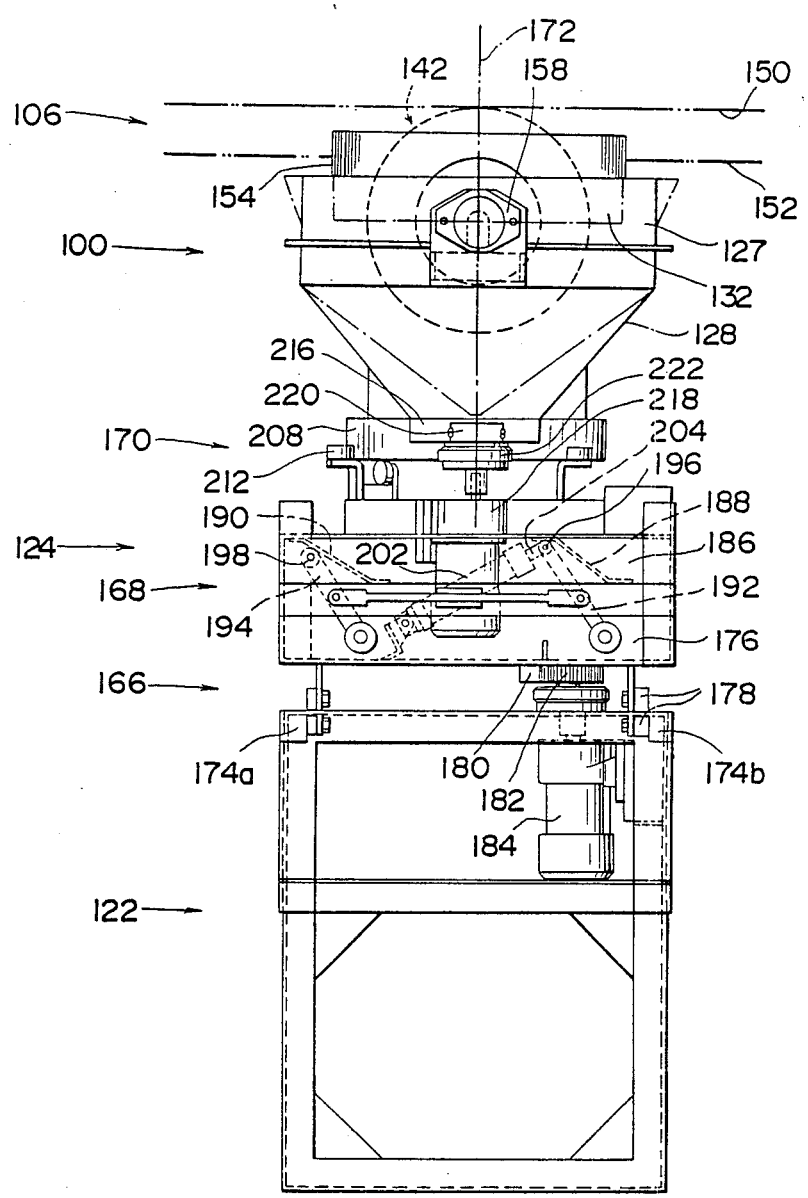
FIG. 4 is an enlarged view of a head assembly and a positioning mechanism therefor used in the head assembly of FIG. 3.
Figure 5:
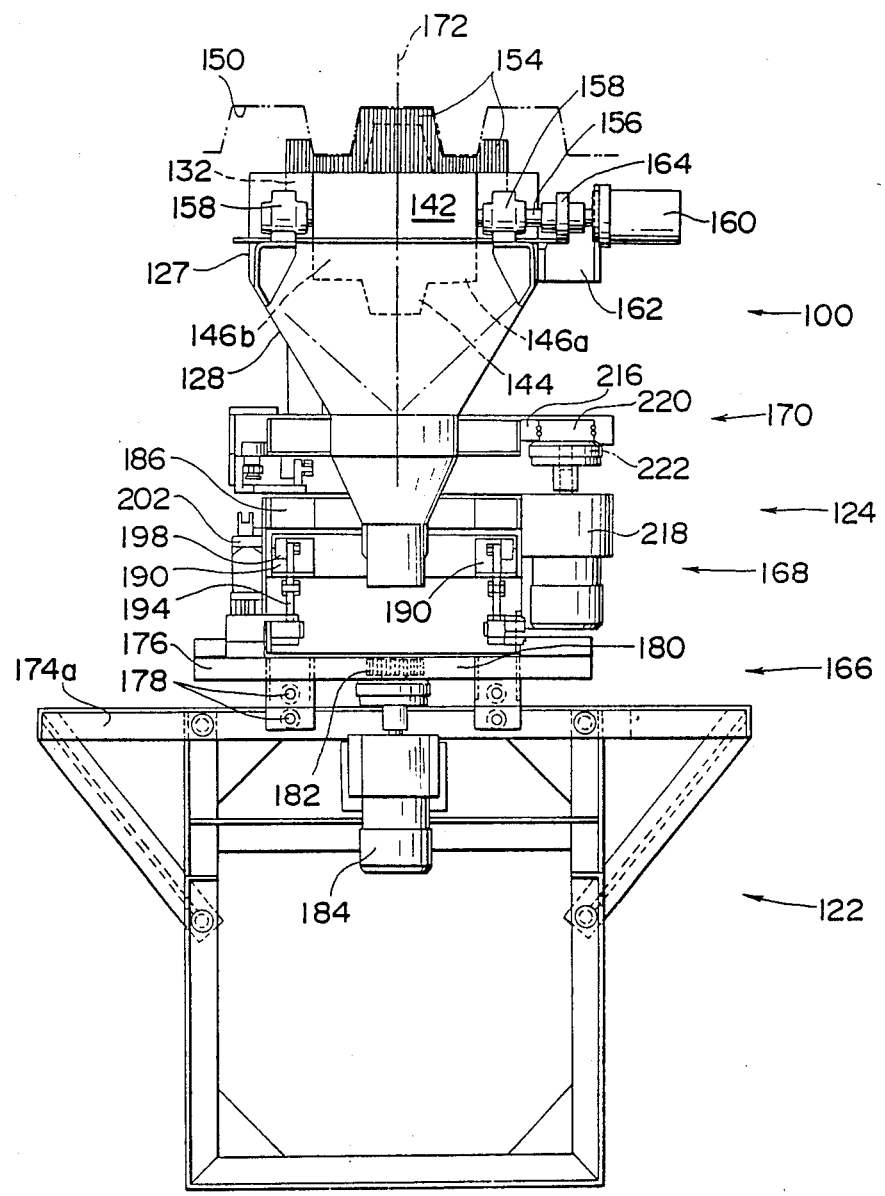
FIG. 5 is a front elevation of the head assembly and the positioning mechanism therefor shown in FIG. 4.
Figure 6:
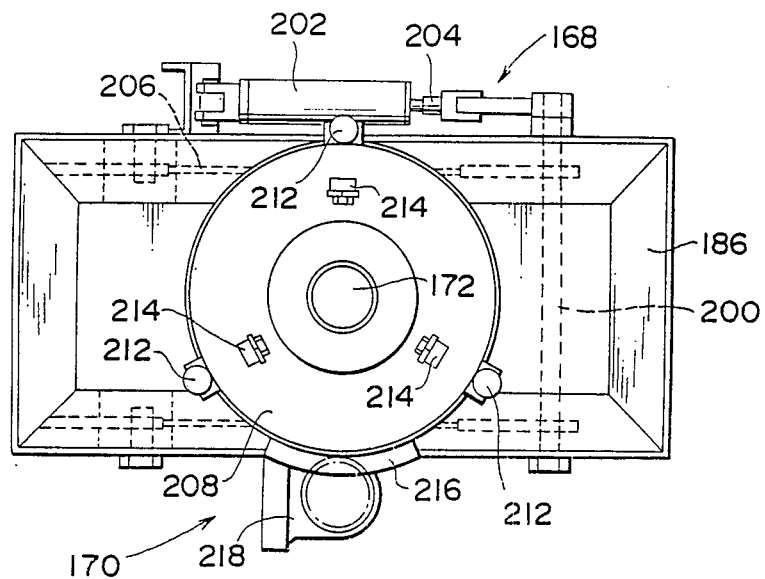
FIG. 6 is a plan view of the head assembly of FIG. 4.

The head assembly 100 of the second embodiment is essentially different from that of the first embodiment in that it employs a wire brush 142 having a general shape complementary to a sectional contour of the grooved ceiling surface, as is seen in FIGS. 4 and 5. In this embodiment also, the head assembly 100 comprises an outer cover 127 generally similar in shape to that of the first embodiment and an inner cover or wall member 132 which is disposed within the outer cover 127 in a spaced relationship and in which the wire brush 142 is rotatably received. As best seen in FIG. 5, the inner cover 132 has attached to the top thereof an upwardly extending barrier means 154 having a profile generally conforming to the sectional contour of the corrugated ceiling surface. The barrier means 154 may be in the form of a brush which also provides for a final clean up of any dust remaining adhered to the corrugated ceiling surface. It should be noted that such a final clean-up brush 154 preferably extends laterally beyond the opposed ends of the wire brush 142.

Figure 7:
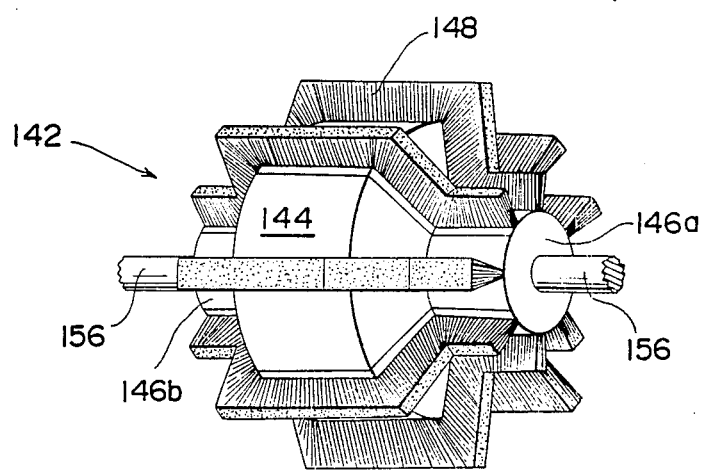
FIG. 7 is a perspective view of a rotary scraping element in the head assembly of FIGS. 4 and 5.

Referring to FIG. 7, the wire brush 142 is shown more specifically to comprise a cylindrical body 144 having a pair of reduced diameter portions 146a and 146b integrally formed with the body on both side thereof in alignment with a common axis. The cylindrical body 144 is so shaped as to fit in a groove 150 of the ceiling 106 and each reduced diameter portion 146a or 146b is dimentioned to have an axial length equal to, or greater than, one half of the width of a ridge 152 between adjacent grooves 150 of the ceiling. The cylindrical body 144 is provided along its entire length with a plurality of axial rows of wire bristles 148 which are spaced equiangularly about the circumference of the body 144. Each row of wire bristles further extends radially inwardly on both the end surfaces of the cylindrical body and then axially on the circumferential surface of each reduced diameter portion. It has been found that use of a wire brush of this type greatly improves the scraping efficiency of the asbestos removing apparatus. The wire brush 142 has a shaft 156 adapted to be journaled in bearing blocks 158 sealingly fitted in the opposed walls of the inner cover 132 within the outer cover 127. A hydraulic motor 160 is mounted on the outer cover 127 at one side thereof by means of a bracket 162 and has its drive shaft drivingly coupled to the driven shaft 156 of the wire brush 142 through a suitable coupling 164.

The positioning mechanism 124 essentially comprises a first section 166 disposed on the framework 122 for slidably moving the head assembly 100 transversely of the travel direction of the apparatus, a second section 168 disposed on the first section 166 for adjusting the height of the head assembly 100 to keep the wire brush 142 in continuous contact with the corrugated ceiling surface and a third section 170 interposed between the head assembly 100 and the second section 168 for turning the head assembly 100 about a vertical axis 172 so as to align the central cylindrical portion of the wire brush 142 with the groove 150 of the corrugated ceiling surface 106.

Turning now to FIGS. 4 and 5, the first section 166 includes a pair of spaced apart guide rails 174a and 174b transversely secured to the framework 122 at the front and rear ends thereof, respectively. A slidable frame 176 is mounted for sliding movement along the guide rails by means of four pairs of vertically aligned rollers 178, between two rollers of each pair of which each guide rail is engagingly interposed. The slidable frame 176 is provided at its bottom with a transverse rack gear 180 extending thereacross and disposed in mesh with a pinion gear 182 with which is drivingly associated a drive motor 184 mounted centrally on the framework 122 at the front side thereof.

The section 168 of the positioning mechanism 124 comprises a lifting table 186 adapted to be mounted for limited vertical movement relative to the slidable frame 176 of the first section 166. Specifically, the lifting table 186 has a front pair of inclined plates 188 attached to the underside thereof along its opposite side portions and a rear pair of inclined plates 190 spaced apart from the front pair 188 and also attached to the underside of the table along its opposite side portions. Disposed between the sliding frame 176 and lifting table 186 are a pair of front arms 192 and a pair of rear arms 194 which are operatively associated with the inclined plates 188 and 190, respectively. The front and rear arms 192 and 194 are pivoted at their lower ends to the opposite inner sides of the frame 176, the other ends of the front and rear arms having rollers 196 and 198 mounted thereto. Each roller is adapted to be in rolling contact with the undersurface of the corresponding inclined plate 188 and 190. Also, the other ends of the arms 192 are interconnected by a transversely extending tie rod 200 (See FIG. 6) which projects from the one side of the lifting table 186. A hydraulic cylinder 202 is pivotally mounted to the one side of the slidable frame 176 and its piston rod 204 is pivotally connected to the projecting end of the tie rod 196. The pair of front arms 192 is connected to the pair of rear arms 194 by tie rods 206 to permit coordinated motion therebetween.

The third section 170 has a circular rotatable table 208 which is mounted for rotational movement relative to the underlying lift table 186 and has a central opening 210 in which is fittingly engaged a lower convergent portion 128 of the outer cover 118 of the head assembly 100 which in turn is connected to a collection drum 40 on the carriage 160 through a flexible hose 42. The lifting table 186 has attached to its upper surface, three guide rollers 212 which are disposed equiangularly about the circumference of the circular table 208 in engaging relationship for establishing an rotating axis 172 about which the circular table 208 rotates and three support rollers 214 which are also disposed equiangularly about the rotating axis 172 of the circular table 208 inwardly of the guide rollers 212 for support of the circular table 208. The rotatable table 208 is provided along a portion of the circumference thereof with an arcuate rack gear 216. On the other hand, the lifting table 186 has secured thereto a drive motor 218 of which drive shaft is operatively connected to a pinion gear 220 through an electromagnetic clutch 222 for bring the pinion gear 220 into or out of driving engagement with the rack gear 216 of the rotatable table 208.

The operation of the positioning mechanism 124 will be described below in more detail. When the asbestos removing apparatus is moved to a position beneath the ceiling surface to be stripped, the positioning mechanism 124 with the head assembly 100 mounted thereon is lifted to a predetermined level by actuation of the lifter 114. In case where the wire brush 142 is improperly oriented relative to the grooves of the corrugated ceiling surface 106, i.e., the rotating axis of the wire brush is not transverse to the longitudinal direction of the groove 150, the electromagnetic clutch 222 is actuated to bring the pinion gear 220 into engagement with the rack gear 216 of the turntable 208. The drive motor 218 is then energized to rotate the turntable 208 and thus the head assembly 100 to bring the wire brush 142 into an operative disposition relative to the groove 150. If the rotating axis 172 of the head assembly 100 is transversely offset with respect to the centerline of the groove 150, then the drive motor 184 is energized to transversely slide the frame 176 on the guide rails 174a and 174b until the wire brush becomes aligned with the ceiling groove 150. Next, the hydraulic cylinder 202 is actuated to pivot the arm pairs 192 and 194 about their respective pivot axes in a clockwise direction as viewed in FIG. 4 to thereby raise the head assembly 100. Simultaneously therewith, the hydraulic motor 160 may be actuated to rotate the wire brush 142, which will urge the wire brush into strippling contact with the asbestos layer in the groove 150, as can be seen in FIG. 8. At this point, it is preferable to disengage the electromagnetic clutch 222 so that a free rotation of the head assembly 100 about its vertical axis of rotation 172 is achieved so as to accommodate any possible misalignment between the wire brush 142 and the groove 150 which may be encountered during subsequent asbestos removing operation.

During each stripping run, as the rotating wire brush reaches a transversely extending I-beam 17 to which the corrugated ceiling panels 106 are joined, the asbestos removing apparatus is stopped and the piston rod 204 of the cylinder 202 is retracted to lower the head assembly so that it may pass under the I-beam 17. When the apparatus has been moved across the I-beam, the above-described procedure is again followed for continued stripping operation. After the stripping run is completed, the apparatus is traversed and the above-described procedure is repeated for another stripping run as shown by arrow in FIG. 8. This will permit the entire asbestos layer to be substantially removed from the corrugated ceiling surface 106.

Figure 17:
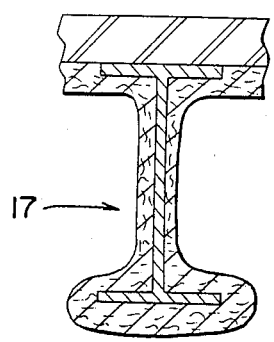
FIG. 17 is a sectional view of an I-beam having asbestos deposited thereon.

Referring to FIGS. 9 and 10, there is shown a third embodiment of the asbestos removing apparatus of the present invention which is adapted for use on an asbestos layer deposited over a structual steel section such as an I-beam 17 (see FIG. 17) which extends beneath the ceiling surface for supporting a plurality of ceiling panels.

The asbestos removing apparatus includes lift means 114 which may be of the same type as that of the second embodiment. A pair of spaced apart parallel guide rails 224 are transversely secured to a horizontally disposed yet vertical movable carriage 120 on its upper surface. Framework structure, generally designated by 226, is arranged for transverse movement on the guide rails 224 in opposite directions as indicated by a double-headed arrow in FIG. 9. More specifically, the framework structure 226 includes a base member 228 having four sets of rollers 230 provided at both sides thereof, each set comprising an upper and a lower roller for movably holding the guide rail therebetween. Fixedly attached to the carriage 120 is a hydraulic cylinder 232 having a piston rod 234 connected to the base member 228 for controlled movement along the guide rails 224. The base member 228 includes an upright support frame 236 rigidly attached to one side thereof and a pair of inclined reinforcing members 238 rigidly interconnecting the base and upright frames 228 and 236.

Figure 11:
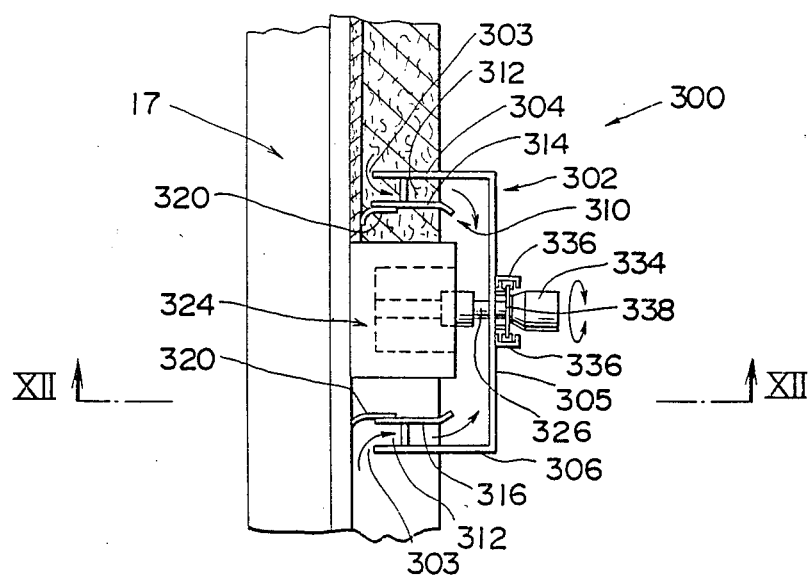
FIG. 11 is a top plan view of the head assembly of FIG. 10, showing the head assembly in more detail.
Figure 13:
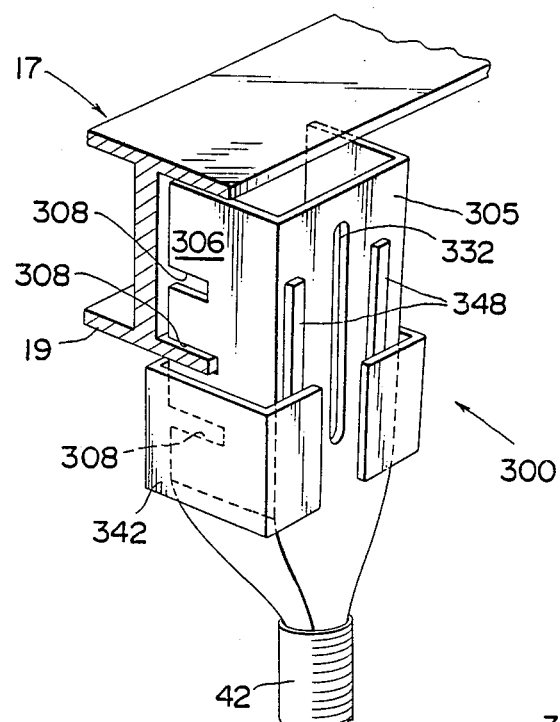
FIG. 13 is a perspective view of the head assembly of the asbestos removing apparatus shown in FIGS. 11 and 12.
Figure 14:
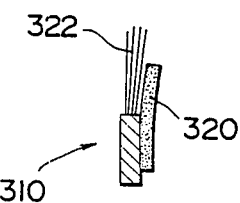
FIG. 14 is a fragmentary enlarged view of an inner cover of the head assembly shown in FIG. 11.

Secured to the upper portion of the upright support frame 236 is an asbestos removing head assembly 300 comprising an outer cover 302 which is coupled to a flexible conduit 42 leading to suction means 50. As best seen in FIGS. 11 and 13, the outer cover 302 is open at its top and also laterally, i.e., toward the I-beam 17. The outer cover also has front and rear side walls 304 and 306 formed with transverse slits 308 at different elevations for receipt of the bottom flange 19 of the I-beam 17. In this embodiment also, it is important to position the head assembly 300 relative to the object to be stripped, i.e., the I-beam such that the open edge of the outer cover 302 faces the I-beam in spaced relationship thereto to provide an air gap 303 therebetween. The location of the transverse slits of the front and rear side walls 304 and 306 is determined to accommodate different types of I-beams; preferably, three slits are formed in this embodiment.

Figure 15:
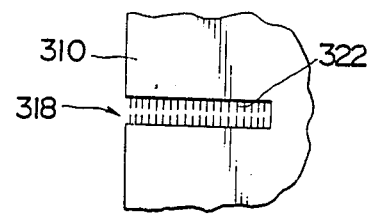
FIG. 15 is a fragmentary enlarged view of an inner cover of the head assembly with a final clean up brush attached internally to a slit of the inner cover.

Securely attached to the inside of the outer cover 302 is an inner cover 310 which defines an air passage 312 between itself and he outer cover 302, adapted for the air entering through the air gap 303 to flow therethrough, as best seen in FIG. 11. The inner cover 310 may also include front and rear side walls 314 and 316 which are formed with transverse slits 318 (FIG. 15) at elevations corresponding to the slits 308 of the outer cover walls 304 and 306, respectively. The front and rear side walls of the inner cover 310 each have attached to their vertically disposed ends barrier means 320 which are in the form of a strip of elastic material as mentioned earlier in conjunction with the first and second embodiments. Flexible bristles 322 made, for example, of synthetic resin may advantageously be attached to the inner cover walls inside the barrier strips for providing a final clean-up of any still adhered particles of asbestos or the like. Use of the flexible bristles 322 of higher density may eliminate the need for the strip barrier 320 because it can serve as barrier means. Also, such flexible brisltes 322 are preferably provided along each slit 318 of the inner cover 310 as shown in FIG. 15.

Figure 16:
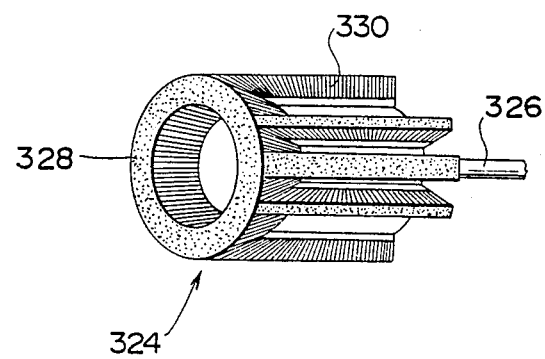
FIG. 16 is a perspective view of a wire brush adapted especially for use in scraping asbestos on an I-beam.

The head assembly 300 also includes a rotary wire brush 324 rotatably mounted within the inner cover 310 for scraping the asbestos on the I-beam 17. As best seen in FIG. 16, the rotary wire brush 324 comprises a shaft 326, a cup-shaped, web stripping section 328 secured to one axial end of the shaft 326, and a flange stripping section 330 comprising a plurality of axially extending brush segments disposed equiangularly on the circumference of the shaft 326. The outer diameter of the rotary wire brush is determined to substantially equal to, or not greater than, the smallest web width of any standard type of I-beam.

Figure 12:
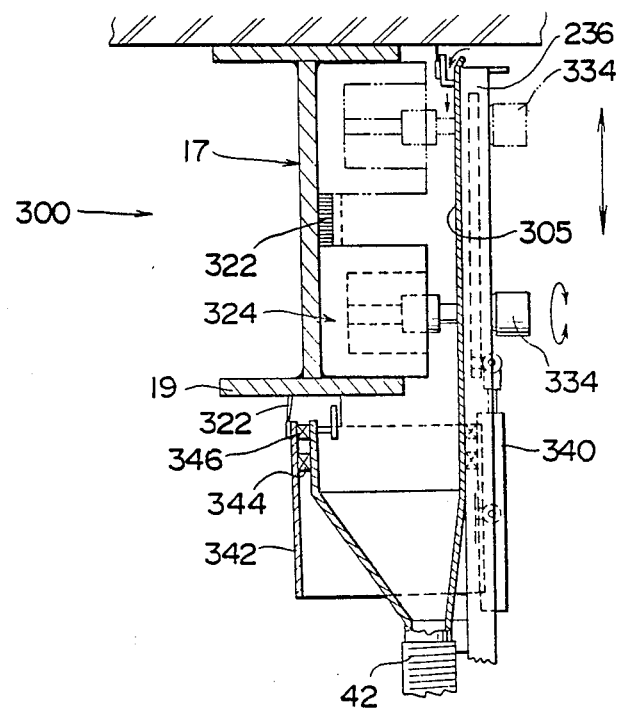
FIG. 12 is a sectional front elevation of the head assembly as taken along lines XII—XII of FIG. 11, showing the head assembly in detail.

The outer cover 302 includes an inboard wall 305 having a central slot 332 formed therein which extends vertically along a substantial portion of the wall length and which is also adapted to receive the shaft of the wire brush 324. The wire brush 324 is drivingly connected to a drive motor 334 of a conventional reversible type. As is best seen in FIGS. 11 and 12, the upright support frame 236 of the frame structure 226 has provided at its respective sides a pair of guide rails 336 extending along the length thereof, within which is slidably fitted a longitudinally extending support member 338 for fixedly supporting the drive motor for the wire brush 324. Secured to the lower portion of the support frame 236 is a hydraulic cylinder 340 which includes a piston rod connected to the lower portion of the support member 338. Thus, by actuating the hydraulic cylinder, it is possible to move the drive motor 334 and accordingly the wire brush 324 upwardly and downwardly, as shown by a double-headed arrow in FIG. 12.

Figure 19:
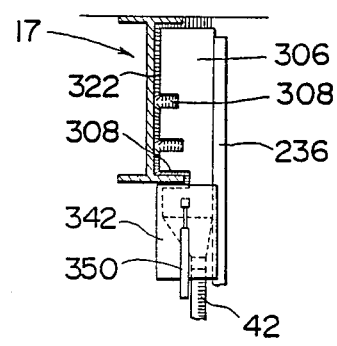
FIGS. 19 and 20 are front elevations of the head assembly showing how a single head assembly having slits of various heights can accommodate I-beams of different size.

The head assembly 300 of the third embodiment includes a movable cover or hood 342 which is disposed to sealingly surround the lower portion of the outer cover 302 to prevent the escape of the removed asbestos pieces and dust from the the outer cover. As shown in FIG. 12, the head assembly 300 also includes a strip-like seal member made preferably of felt material 344 which is bonded to the outer surface of the lower chute portion of the head assembly 300 immediately below the top edge thereof. To cooperate with the seal member 344, a corresponding strip-like felt seal 346 is bonded to the inner surface of the upper portion of the movable hood 342. In FIGS. 12 and 19, the movable hood 342 is shown in its lowermost position wherein the elongate seal 346 on the surrounding cover 342 is at a higher elevation than the elongate seal 344 on the outer cover 302. As shown in FIG. 13, the inboard wall 305 of the outer cover 302 includes a pair of parallel felt strips 348 attached to the outer surface thereof on both sides of the vertical slot 332. These felt strips 344, 346 and 348 cooperate to effectively seal the lower portion of the outer cover 302 to prevent the removed asbestos material from escaping into the surrounding environment.

With reference to FIGS. 9, 10 and 12, a hydraulic cylinder 350 is secured relative to the upright support frame 236 for moving the movable cover 342 in a vertical direction so as to accommodate different types of I-beams. To this end, the piston rod of the hydraulic cylinder 350 is connected to one side of the movable cover 342. Mounted to the opposite side of the cover 342 is a pair of spaced apart sliders 352 adapted for sliding movement on a vertical guide bar 354 secured to the upright support frame 236. This arrangement permits an adjustment of the vertical position of the movable cover 342 depending upon the vertical extent of an I-beam to be stripped.

Figure 20:
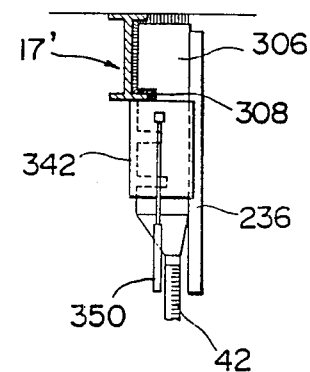

In operation, the asbestos removing apparatus is wheeled into position beneath an I-beam to be stripped. Through a controlled operation of the lifter 114, the head assembly 300 is raised to such a level that selected sets of the transverse slits 308 and 318 of the outer and inner covers 302 and 310, respectively, can receive the lower flange of the I-beam. Then, the hydraulic cylinder 232 is actuated to controllably move the head assembly 300 in a transverse direction until the wire brush 324 comes into contact with the asbestos layer on the I-beam 17. Next, the hydraulic cylinder 350 is actuated to move the movable cover 342 upwardly until a brush attached to the top edge of the movable cover comes into intimate contact with the underside of the flange of the I-beam, as shown in FIG. 19. In case where the I-beam to be stripped has a relatively short web, the flange of the I-beam may be received by the uppermost sets of transverse slits formed in the outer and inner covers, as shown in FIG. 20.

Figure 18:
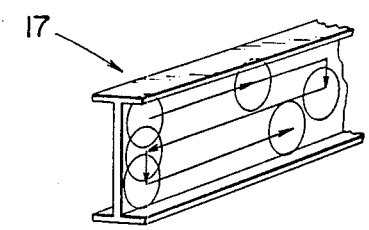
FIG. 18 is a perspective view showing how the stripping operation is performed on an I-beam.

The drive motor 334 of the head assembly 300 is then initiated to rotate the wire brush 324 and, simultaneously therewith, the hydraulic cylinder 232 is actuated to advance the rotating wire brush 234 into a position wherein the web stripping brush section 328 is in stripping contact with the upper portion of the web while, at the same time, the flange stripping section is in scraping contact with the underside of the upper flange of the I-beam. With the rotating wire brush held in this position, the head assembly 300 is moved along the I-beam by wheeling the asbestos removing apparatus through actuation of a transport motor (not shown). After such a stripping run is completed, the hydraulic cylinder 340 is actuated to reposition or slightly lower the wire brush 324 to come into stripping contact with the central portion of the beam web and the apparatus again is wheeled in the opposite direction for another stripping run. The stripping operation is repeated to provide a series of runs as needed as indicated by several arrows in FIG. 18. The same procedure as described above can apply to the opposite side of the I-beam. It will be appreciated by those skilled in the art that the removal of the asbestos on the undersurface of the beam flange can be easily attained in a manner that effectively prevents the escape of the removed asbestos pieces into the surrounding environment.

The present invention may be practiced or embodied in still other ways without departing from the spirit or essential character thereof. For example, while in the illustrated preferred embodiments a rotary wire brush is employed, a cutting drum or concrete milling cutter may be equally used and also an asbestos remover of reciprocating or vibrating type may be used with required modifications to arrangements of the apparatus of the invention. Additionally, for example, the asbestos removing head assembly of the first embodiment may be disposed on the movable upper frame in such a manner as to enable the rotating wire brush to strip a vertical wall on which asbestos is applied. The preferred embodiments described herein are therefore illustrative only and not restrictive, the scope of the invention being indicated by the appended claims and all variations which fall within the meaning of the claims are intended to be embraced therein.

What is claimed is:

1. Apparatus for removing a layer of asbestos or like material from a surface, comprising:

a head assembly comprising an outer cover having a first open portion adapted to face the asbestos layer and a second open portion comprising an outlet for the outer cover, an inner wall member mounted within the outer cover to define an air passage between the inner wall member and the outer cover, the air passage communicating with the outlet of the outer cover, and scraping means mounted within the inner wall member and adapted to engage and remove the asbestos layer from the surface, lift means for raising the head assembly in proximity to the surface, the lift means being adapted to travel on a floor in a direction parallel to the plane of the surface;

adjusting means disposed between the head assembly and the lift means for adjustably moving the head assembly to an operative position wherein the scraping means is in scraping contact with the asbestos layer with a small gap present between the surface and the peripheral edge of the first open portion of the outer cover; and collection means communicating with the outlet of the outer cover and including suction means for withdrawing the removed asbestos from the outer cover, the suction means being effective to suck the ambient air into the air passage in the outer cover through the small gap between the peripheral edge of the first open portion thereof and the surface being scraped so that the sucked air entrains asbestos laden dust from the inner wall member, thereby preventing the escape of the removed asbestos to the ambient environment.

2. The apparatus according to claim 1, further comprising resilient barrier means mounted to the peripheral edge of the inner wall member and adapted to be in sliding contact with the surface to be scraped when the head assembly is in the operative position.

3. The apparatus according to claim 2, wherein the resilient barrier means comprises a brush having a density sufficient to prevent the removed asbestos from escaping from the inner wall member to the ambient environment.

4. The apparatus according to claim 2, wherein the resilient barrier means comprises a plurality of strips made of elastic material such as rubber, elastomer, etc.

5. The apparatus according to claim 4, further comprising brush means including bristles made of synthetic resin and attached to the inner surfaces of the strips for providing a final clean-up of any dust remaining adhered to the surface after scraping.

6. The apparatus according to claim 1, wherein the scraping means comprising a rotary wire brush.

7. The apparatus according to claim 6, wherein the surface to be scraped is a generally planar ceiling surface and the rotary wire brush is generally of a cylindrical configuration.

8. The apparatus according to claim 6, wherein the surface to be scraped is a corrugated ceiling surface and the rotary wire brush has a longitudinal section complementary to the cross section of the corrugated ceiling surface, the rotary wire brush comprising a cylindrical body adapted to fit in a groove of the corrugated ceiling surface and a pair of reduced diameter portions integrally formed with the cylindrical body on both sides thereof in alignment with a common axis.

9. The apparatus according to claim 8, further comprising sliding mechanism mounted on the lift means for adjustably moving the head assembly in a direction parallel to the axis of the rotary wire brush to fit the cylindrical body thereof into the groove of the corrugated ceiling surface.

10. The apparatus according to claim 8, further comprising turning mechanism including a turntable for supporting the head assembly in a manner that permits adjustment of the orientation of the rotary wire brush with respect to the groove of the corrugated ceiling surface.

11. Apparatus for removing a layer of asbestos or like material from an I-beam having a web portion and an upper and a lower flange portion, comprising:

a head assembly comprising an outer cover having a first open portion adapted to face the web portion, a second open portion adapted to face the upper flange portion of the I-beam and a third open portion comprising an outlet for the outer cover, an inner wall member mounted within the outer cover to define an air passage between the inner wall member and the outer cover, the air passage communicating with the outlet of the outer cover, and scraping means mounted within the inner wall member and adapted to engage and remove the asbestos layer from the I-beam;

hood means mounted on the head assembly for vertical movement relative to the inner wall member and the outer cover to sealingly surround a portion of the first open portion of the outer cover;

lift means for raising the head assembly in proximity to the I-beam to be scraped, the lift means being adapted to travel on a floor in a direction parallel to the I-beam;

adjusting means disposed between the head assembly and the lift means for adjustably moving the head assembly to an operative position wherein the scraping means is in scraping contact with the surface of the I-beam with a small gap present between the peripheral edges of the first and second open portions of the outer cover and the web portion and the undersurface of the upper flange of the I-beam;

collection means communicating with the outlet of the outer cover and including suction means for withdrawing the removed asbestos from the outer cover, the suction means being effective to suck the ambient air into the air passage in the outer cover through the small gap between the peripheral edges of the first and second open portions of the outer cover and the surfaces of the I-beam being scraped so that the sucked air entrains asbestos laden dust from the inner wall member, thereby preventing the escape of the removed asbestos to the ambient environment.

12. The apparatus according to claim 11, wherein the outer cover and the inner wall member have a plurality of sets of aligned horizontal slits formed therein at different elevations to receive the lower flange of I-beams of different web lenghts.

13. The apparatus according to claim 11, further comprising resilient barrier means mounted to the peripheral edges of the inner wall member and adapted to be in sliding contact with the surface of the web portion and the undersurface of the upper flange of the I-beam when the head assembly is in the operative position.

14. The apparatus according to claim 13, wherein the resilient barrier means comprises a brush having a density sufficient to prevent the removed asbestos from escaping the inner wall member to the ambient environment.

15. The apparatus according to claim 13, wherein the resilient barrier means comprises a plurality of strips made of elastic material such as rubber, elastomer, etc.

16. The apparatus according to claim 15, further comprising brush means including bristles made of synthetic resin attached to the inner surfaces of the strips for providing a final clean-up of any dust remaining adhered to the surfaces of the I-beam after scraping.

17. The apparatus according to claim 11, wherein the scraping means comprises a rotary wire brush having an axis of rotation generally perpendicular to the longitudinal axis of the I-beam.

18. The apparatus according to claim 17, wherein the rotary wire brush comprises a shaft mounted for vertical movement along a vertically extending guide slot in the outer cover, a cup-shaped, web stripping section secured to one axial end of the shaft, and a flange stripping section comprising a plurality of axially extending brush segments disposed equiangularly on the circumference of the shaft.

* * * * *